United States Patent
Mains, Jr.

[11] Patent Number: 6,129,839
[45] Date of Patent: Oct. 10, 2000

[54] SEPARATION SYSTEM FOR IMMISCIBLE LIQUIDS

[76] Inventor: Gilbert L. Mains, Jr., 4621 Pebble Bay East, Vero Beach, Fla. 32963

[21] Appl. No.: 09/183,043

[22] Filed: Oct. 31, 1998

Related U.S. Application Data

[60] Provisional application No. 60/063,829, Oct. 31, 1997.

[51] Int. Cl.[7] ........................................... C02F 1/40
[52] U.S. Cl. ...................... 210/188; 210/521; 210/532.1; 210/539; 210/540; 210/DIG. 5
[58] Field of Search ..................... 210/188, 521, 210/532.1, 538, 539, 540, 259, DIG. 5

[56] References Cited

U.S. PATENT DOCUMENTS

| | | | |
|---|---|---|---|
| 2,613,811 | 10/1952 | Archibald | 210/521 |
| 2,730,190 | 1/1956 | Brown et al. | |
| 2,766,203 | 10/1956 | Brown et al. | |
| 3,425,913 | 2/1969 | Holden | 210/521 |
| 3,479,281 | 11/1969 | Kikindai et al. | |
| 3,565,252 | 2/1971 | Sheeby et al. | |
| 3,643,802 | 2/1972 | Jackson, Jr. | |
| 3,878,094 | 4/1975 | Conley et al. | |
| 3,937,662 | 2/1976 | Bartik | |
| 3,996,136 | 12/1976 | Jakubek et al. | |
| 4,031,839 | 6/1977 | Pedone | |
| 4,032,453 | 6/1977 | Pedone | |
| 4,061,573 | 12/1977 | Biron | |
| 4,115,279 | 9/1978 | Toft | 210/521 |
| 4,139,463 | 2/1979 | Murphy et al. | |
| 4,157,969 | 6/1979 | Thies | 210/521 |
| 4,546,783 | 10/1985 | Lott | |
| 4,650,581 | 3/1987 | Angles et al. | 210/DIG. 5 |
| 4,797,063 | 1/1989 | Lott | |
| 4,830,755 | 5/1989 | Hardin | |
| 5,073,261 | 12/1991 | Conradi et al. | 210/538 |
| 5,114,578 | 5/1992 | Sundstrom | 210/521 |
| 5,227,071 | 7/1993 | Torline et al. | |
| 5,388,542 | 2/1995 | Fischer et al. | |
| 5,474,672 | 12/1995 | Peterson et al. | |
| 5,545,330 | 8/1996 | Ehrlich | |
| 5,554,301 | 9/1996 | Rippetoe et al. | |
| 5,603,825 | 2/1997 | Costinel | |
| 5,609,760 | 3/1997 | Leach | |

*Primary Examiner*—Christopher Upton
*Attorney, Agent, or Firm*—Reising, Ethington, Barnes, Kisselle, Learman & McCulloch, P.C.

[57] ABSTRACT

A separation system (10) for immiscible liquids such as oil and water. The system is particularly useful for treating bilge water on ships. The system includes a bilge water holding tank (12), pre-filter tank (14), separator (16), oil accumulator (18), coalescer (20), air refining chamber (22), and pump (24). Oily water is drawn by pump (24) from holding tank (12) and is then processed sequentially through pre-filter tank (14), separator (16), and coalescer (20) and can thereafter be pumped overboard. Separator (16) and coalescer (20) are disposed at an inclined angle so that the oil will float upwards and out into oil accumulator (18) and refining chamber (22). At each stage in the process, oil is separated out from the water and accumulates at the surface of the water in pre-filter tank (14), oil accumulator (18), and refining chamber (22). Using a second pump (28), the accumulated oil can be intermittently or continuously pumped from these vessels into a waste oil holding tank (26). Separator (16) utilizes a plurality of spaced, perforated, polypropylene plates to control the flow of water through the separator and to accumulate and separate out the oil. Coalescer (20) includes an air scrubber (106) formed from a stack of annular polypropylene disks having ribs on each side that, when stacked, define a sinuous flow path between each pair of disks. Air injected into the water flows outwardly through air scrubber (106) and helps separate out the finer droplets of oil.

20 Claims, 3 Drawing Sheets

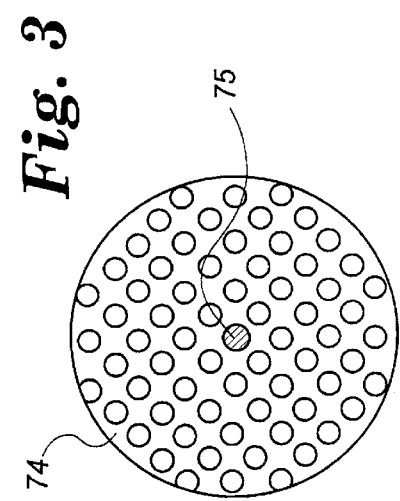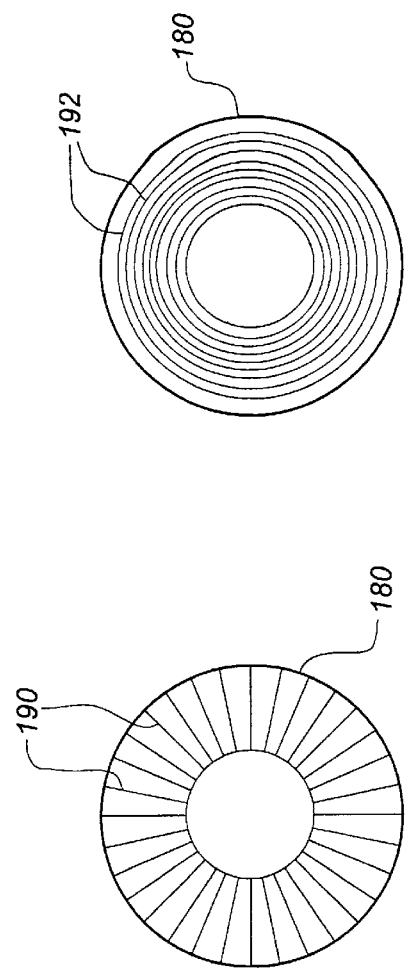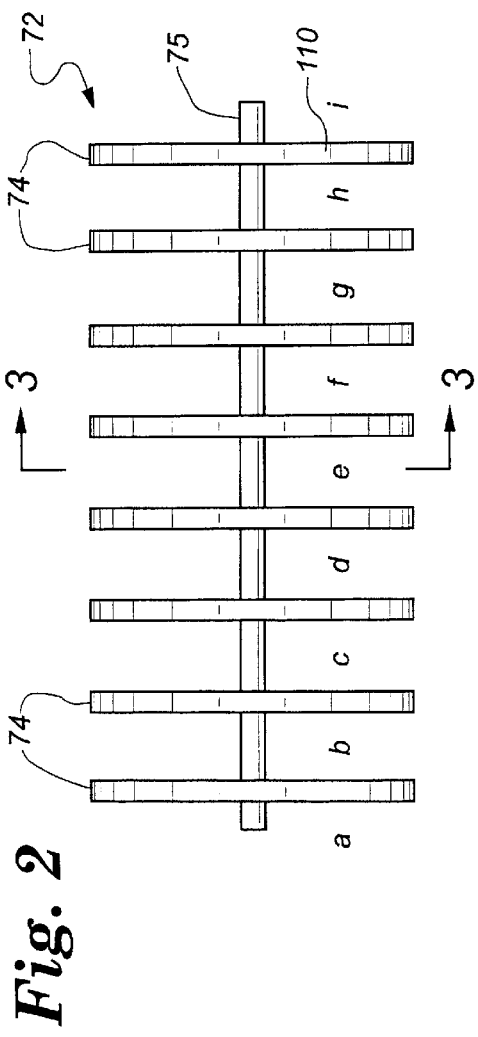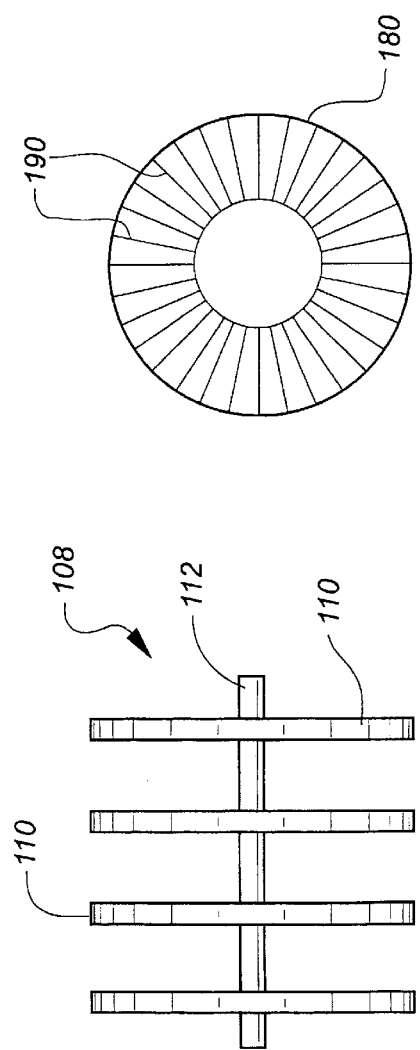

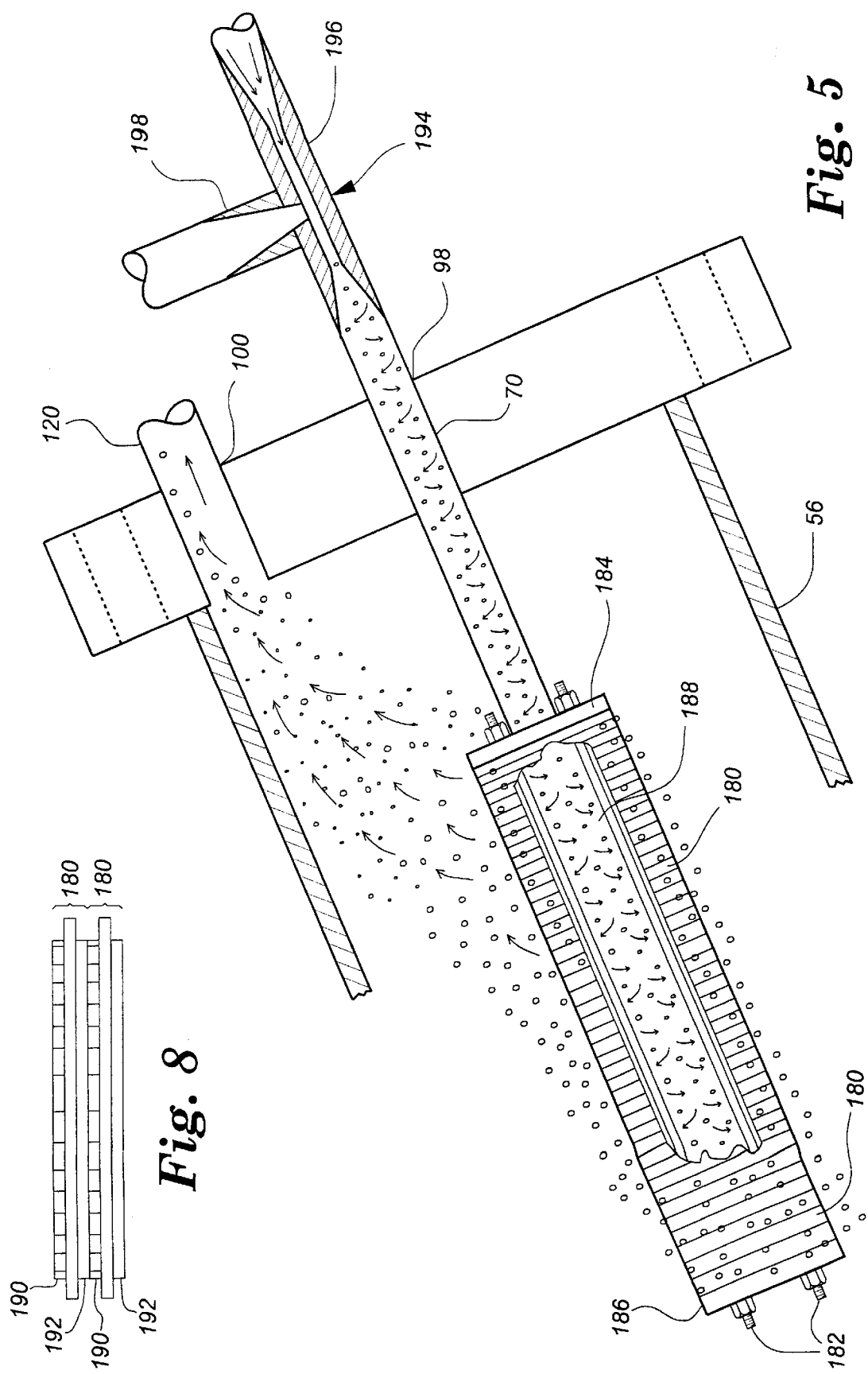

SEPARATION SYSTEM FOR IMMISCIBLE LIQUIDS

This application claims the benefit of the U.S. Provisional Application No. 60/063,829, filed Oct. 31, 1997.

FIELD OF THE INVENTION

The present invention is directed generally to separation of immiscible liquids and is particularly useful for treating contaminated water to remove oils and other hydrocarbon based contaminants.

BACKGROUND OF THE INVENTION

As concern over the environmental quality of the world's oceans continues to grow, environmentalists' attention is increasingly focusing on the widespread practice within the maritime industry of dumping polluted bilge water overboard. While many countries attempt to protect against such practices by the threat of criminal penalties and fines amounting to millions of dollars, such deterrence measures are difficult to enforce and are often easily avoided by operators who travel in and out of regulated waters. Unfortunately, pumping polluted water overboard is simpler and less expensive than either cleaning the water prior to pumping overboard or holding the polluted water until arriving in port where it can be pumped to a land based water treatment facility. As a result, pumping the polluted water overboard in unprotected waters is a daily occurrence accounting for millions of gallons of polluted water being dumped into the world's oceans every year. Many land based operations also produce polluted aqueous mixtures that can have a negative environmental impact. Like the bilge water that accumulates within a ship's hull, these land based operations often produce large quantities of water contaminated with oil, fuel, and other hydrocarbon based waste.

Physical separation systems exist which can treat the water at varying levels of effectiveness and efficiency. For example, API separators, inclined separators, and weir separators can all be used to separate out some of the oils and other immiscible liquids in a supply of contaminated water. However, these systems cannot effectively remove the finer droplets of oils nor oils having a relatively neutral buoyancy. Consequently, these systems are not suitable for shipboard use since they do not produce treated water that is sufficiently clean to return to the ocean. While finer filtration elements or chemical treatments can be used to handle the smaller oil droplets, such added components can be expensive and more labor intensive to maintain. Accordingly, there exists a need for a system that can be used to decontaminate polluted water in a manner which reduces or eliminates the incentive for operators to simply dump the polluted water into the environment. Also, apart from the treatment of contaminated water, there exists a need more generally for a system that can separate any immiscible liquids (i.e., two or more liquids that do not form a homogeneous solution when mixed).

SUMMARY OF THE INVENTION

In accordance with the invention there is provided a system for separating immiscible liquids such as oil and water. The system is particularly useful in treating water contaminated with oil and other such hydrocarbon based liquids. The system includes a separator, oil accumulator, coalescer, and a pump which draws the oil/water mixture through the separator and the coalescer. The separator has a housing that includes an inlet, a water outlet, and an oil outlet, with the separator having a plurality of perforated plates or other such flow restrictors that are spaced within the housing between the inlet and the outlets. The flow restrictors and the housing together defining a plurality of sequential chambers located between the inlet and the outlets. The separator is disposed at an inclined angle with the inlet being located at a lower end of the housing and the outlets being located at an upper end of the housing such that the inlet opens into a first chamber within the housing and the outlets open into a last chamber within the housing. The oil outlet is located above the water outlet at the upper end of the housing. The oil accumulator has an oil inlet and an oil outlet with the oil inlet being coupled to the oil outlet of the separator. The coalescer has a housing that includes an inlet, a water outlet, and an oil/air outlet. The coalescer is disposed at an inclined angle with the inlet and the oil/air outlet being located at an upper end of the coalescer housing and the water outlet being located at a lower end of the coalescer housing. The inlet of the coalescer is coupled to the water outlet of the separator and is located below the oil/air outlet at the upper end of the coalescer housing. The coalescer includes an air scrubber located in the coalescer housing between the upper and lower ends of the coalescer housing. The air scrubber provides a cross-flow of air bubbles which aid in separating out smaller oil droplets that were not removed in the separator.

Preferably, the system also includes a pre-filter tank for removing solids from the contaminated water and a second accumulator (air refining chamber) having an inlet, an air outlet, and an oil outlet. The inlet of the second accumulator is coupled to the air/oil outlet of the coalescer and the air outlet is located at an upper portion of the second accumulator and is coupled to the coalescer to provide air to the air scrubber. The air can be injected into the coalescer along with the water coming from the separator using an air injection manifold connected in series with the water feed line running between the separator water outlet and the coalescer inlet. The air injection manifold includes a venturi inlet port that is coupled to the air outlet of the second accumulator. Water flow through the coalescer feed line draws air from the second accumulator which is mixed into the water stream flowing into the coalescer. The coalescer inlet is connected to the air scrubber which can be formed from a stack of annular plates. Together, these plates define an inner chamber with each of the plates having a surface conformation that together provides a sinuous flow path for the air/water mix from the inner chamber to the exterior of said air scrubber.

In operation, the contaminated water first flows into the pre-filter tank where a filter is used to remove solids and suspended particulate. Initial separation of the oil and water also occurs at this point. The water is then drawn into the separator where it flows upward through the perforated plates and into each of the chambers. The flow through each chamber is substantially laminar, allowing the oil to settle out and rise to the upper portion of the chambers. Due to the inclination of the separator housing and the upward movement of water through the separator, the separated oil flows upward through the top portions of the perforated plates to the oil outlet at the upper end of the separator housing. This oil flows up into the oil accumulator. The water at the top of the separator is drawn into the air scrubber along with the air that is drawn into the water stream at the air injector manifold. The air/water mixture flows from the inner chamber of the air scrubber out through the sinuous paths existing between the air scrubber plates. Smaller droplets of oil that remain, as well as oil of neutral buoyancy, attaches to the surface of the air bubbles leaving the air scrubber and is drawn along with the air bubbles up into the second accumulator. The cleaned water then exits the coalescer at the lower end of the coalescer housing. Accumulated oil in the pre-filter tank, oil accumulator, and second accumulator can be removed from these components by a separate pump that pumps the oil into a waste oil holding tank.

BRIEF DESCRIPTION OF THE DRAWINGS

A preferred exemplary embodiment of the present invention will hereinafter be described in conjunction with the appended drawings, wherein like designations denote like elements, and:

FIG. 2 depicts a side view of the separator plate assembly used within the separation system of FIG. 1;

FIG. 3 is a sectional view taken along the 3—3 line of FIG. 2 showing a side view of the perforated plates used in the separator plate assembly of FIG. 2;

FIG. 4 depicts a side view of the coalescer plate assembly used within the separation system of FIG. 1

FIG. 5 is an enlarged fragmentary view of a portion of the separation system of FIG. 1 showing the air scrubber located in the upper portion of the coalescer;

FIG. 6 is top view of one of annular plates shown in FIG. 5;

FIG. 7 is a bottom view of the annular plate of FIG. 6; and

FIG. 8 is a side view showing two of the annular plates of FIGS. 6 and 7 stacked together.

DESCRIPTION OF THE PREFERRED EMBODIMENT

Figure 1:
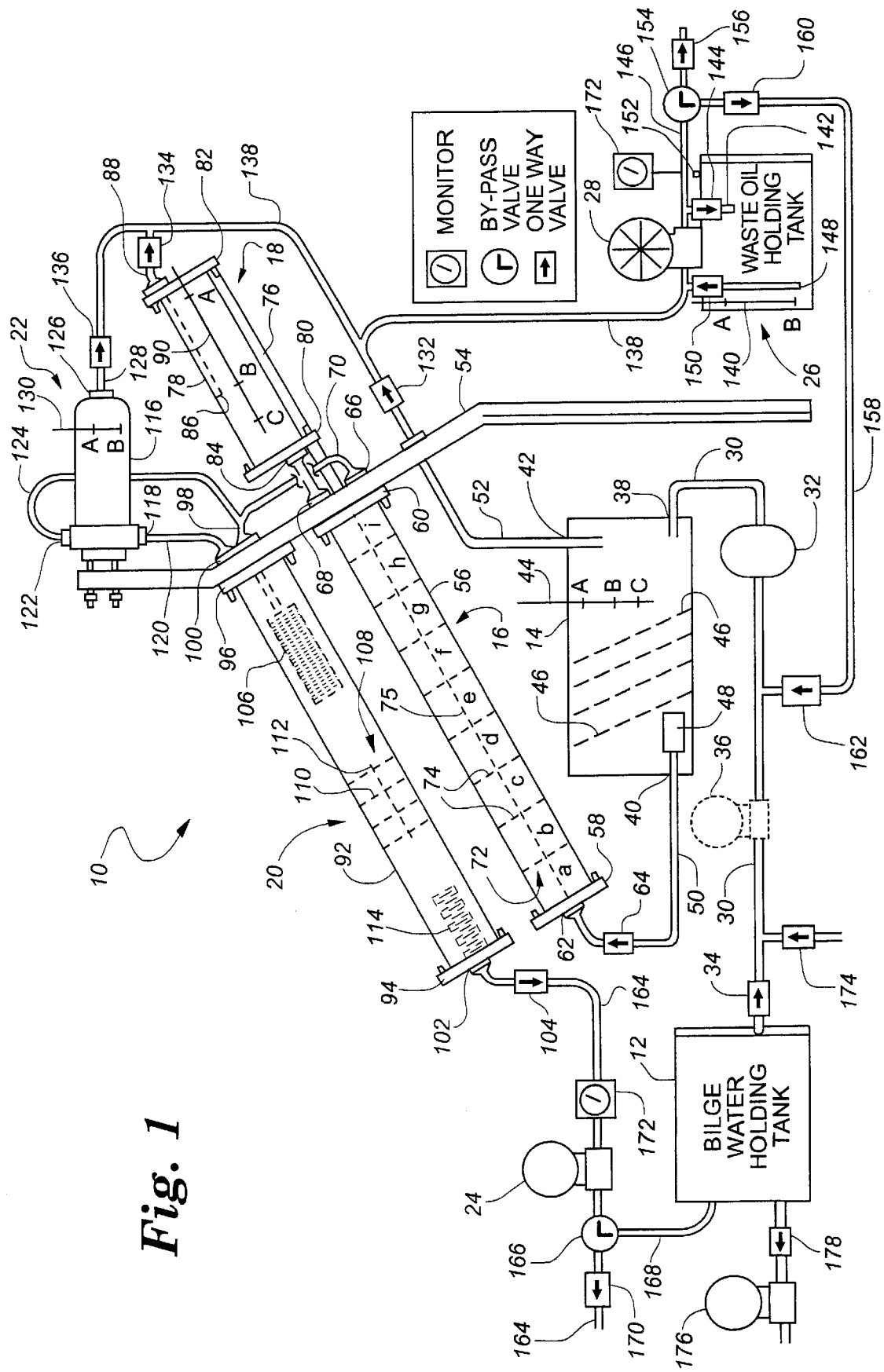
FIG. 1 is a side view and partially schematic view of a preferred embodiment of the invention comprising an oil/water separation system for use on ships to decontaminate bilge water.

The illustrated embodiment will be described as the invention might be used in a marine application to treat oily bilge water, ballast water, and waters from other cleaning and descaling operations. However, it will be appreciated that the invention can be used to clean any other water contaminated with hydrocarbons, reclaiming for example all oils from fuel and oil storage tanks. More generally, the invention can be used to separate any immiscible liquids, such as may be generated by manufacturing processes or machining and metalworking operations, or as may be present naturally in such things as crude oil. Moreover, while the invention is directed to separation of liquids, it can also be used to separate suspended solids from liquids where the suspended solid behave as a liquid having a different specific gravity than the liquid in which they are suspended. Accordingly, as used herein the term "liquid" will be understood to include such suspensions of solids.

OVERVIEW AND CONSTRUCTION OF THE SEPARATION SYSTEM

Referring now to FIG. 1, there is shown a separation system 10 which includes as its main components a bilge water holding tank 12, pre-filter tank 14, separator 16, oil accumulator 18, coalescer 20, air refining chamber 22, pump 24, waste oil holding tank 26, and a second pump 28. In general, oily or otherwise contaminated bilge water is drawn by pump 24 from holding tank 12 and is then processed sequentially through pre-filter tank 14, separator 16, and coalescer 20 and can thereafter be pumped overboard after any further treatment if needed. At each stage in the process, oil is separated out from the water and accumulates at the surface of the water in pre-filter tank 14, oil accumulator 18, and refining chamber 22. Using pump 28, the accumulated oil can be intermittently or continuously pumped from these vessels into waste oil holding tank 26.

Bilge water holding tank 12 is connected via an intake line 30 to a coarse strainer 32 and then to pre-filter tank 14. Strainer 32 prevents debris such as sea weed from entering pre-filter tank 14 and can comprise a wire mesh or plates with 1.8" perforations. A one way valve 34 is connected in series with intake line 30 to permit control over the supply of bilge water to the system and to prevent any backflow from the system into holding tank 12. If desired, an optional pump 36 can be placed in series with intake line 30 to fill pre-filter tank 14. Pump 36 may be needed if the suction from pump 24 is insufficient to draw the contaminated water from holding tank 12 into pre-filter tank 14.

Pre-filter tank 14 includes an inlet 38, water outlet 40, oil outlet 42, level sensor 44, filter plates 46, and a grit filter 48. Intake line 30 opens into pre-filter tank 14 at its inlet 38. Connected to water outlet 40 is a separator feed line 50. Grit filter 48 is located at the inlet of feed line 50 and is used to prevent dirt and grit from entering separator 16. Preferably, grit filter 48 filters the contaminated water leaving tank 14 down to approximately 150 microns. Oil outlet 42 is located at the top of tank 14 and is connected to an oil waste line 52 through which the separated oil can be transferred to waste oil holding tank 26. Level sensor 44 can be a dual bulb sensor as will be known to those skilled in the art. Level sensor 44 senses the level of oil and water in tank 14 at levels A, B, and C and is used in priming the system and to insure that proper levels in tank 14 are maintained during operation. Filter plates 46 are inclined, perforated plates that operate to create a laminar flow across tank 14 from its inlet 38 to its outlet 40. This arrangement has been found to operate more efficiently than traditional inclined plate separators and weir separators.

Separator 16 is supported on a frame 54 and comprises a cylindrical housing 56 that extends from a lower end 58 to an upper end 60. Separator 16 includes an inlet 62 at its lower end 58 which is connected via a one-way valve 64 and feed line 50 to the outlet 40 of pre-filter tank 14. At the upper end 60 of housing 56 is a water outlet 66 and an oil outlet 68. Water outlet 66 is connected via a coalescer feed line 70 to coalescer 20. Oil outlet 68 is connected directly to oil accumulator 18 which is located above the upper end 60 of housing 56. Located within separator 16 is a separator plate assembly 72 that comprises a number of spaced plates 74. These plates divide separator 16 into a plurality of sequential chambers, as indicated in FIG. 1 by the letters a–i. Referring briefly to FIGS. 2 and 3, separator plate assembly 72 comprises a number of polypropylene plates 74 and a center retaining rod 75. Plates 74 are perforated with ³⁄₁₆" holes on ⁷⁄₁₆" centers and the plates are spaced approximately 3–4" apart. The open cross-sectional area of the plates is approximately 30–33% of the total cross-sectional area. The diameter of the perforated plates is within ten thousands of an inch of the internal diameter of housing 56 so that the plates fit snugly into housing 56 and will only permit negligible water flow between the plates and housing 56. Retaining rod 75 extends through each of the plates 74 and attaches to housing 56 at its upper end 60. The oil is attracted to the polypropylene plates which helps separate the oil from the water flowing past the plates. Also, the plates act as flow restrictors that prevent channeling of water or oil as it traverses housing 56 and that provide a laminar flow of the water and oil through each of the chambers. This aids in the separation of oil and water.

Oil accumulator 18 is supported on an extension 76 of frame 54 and comprises a cylindrical housing 78 that extends from a lower end 80 to an upper end 82. Accumulator 18 has an oil inlet 84 at its lower end 80 that is connected to outlet 68 of separator 16. Accumulator 18 is located on frame 54 above separator 16 so that the oil from separator 16 will flow upwards into accumulator 18 displacing the water held therein. At the upper end 82 of accumulator 18 is an oil outlet 86 that is connected to an oil waste line 88 that permits oil within accumulator 18 to be transferred to waste oil holding tank 26. Accumulator 18 includes a level sensor 90 that can be the same as or similar to level sensor 44 and that is used in priming the system and to determine that the proper levels are maintained in accumulator 18 during operation.

Coalescer 20 is supported on frame 54 next to separator 16. Coalescer 20 comprises a cylindrical housing 92 extending between a lower end 94 and an upper end 96. Coalescer 20 includes an inlet 98 and oil outlet 100 at its upper end 96. Inlet 98 is connected to feed line 70 to receive water from separator 16 and outlet 100 is located above inlet 98 and is connected to air refining chamber 22. At lower end 94 of housing 92 is a water outlet 102 that is coupled via a one-way valve 104 to pump 24. Coalescer 20 includes an air scrubber 106 that is used to inject the water received at inlet 98 into the interior of housing 92 along with air bubbles that provide a cross-flow air scrubbing of the water as it travels from air scrubber 106 down towards water outlet 102. Coalescer 20 also includes a coalescer plate assembly 108. Referring briefly to FIG. 4, plate assembly 108 comprises a number of polypropylene plates 110 that are identical to plates 74 of separator 16. A center retaining rod 112 extends between each of the plates 110 to maintain their spacing. The plates are spaced approximately four inches apart. Coalescer 20 also includes a well suction screen or well point 114 having slits that are 1/64" in width and spaced 3/16" apart. Well point 114 helps maintain a laminar flow at the water outlet 102 of coalescer 20.

Air refining chamber 22 is an air/oil accumulator that receives and retains the oil removed in coalescer 20. Chamber 22 comprises a vessel 116 that is mounted on frame 54 above coalescer 20. It includes an air/oil inlet 118 on its underside that is connected to oil outlet 100 of coalescer 20 by a substantially vertically-extending feed line 120. At the top side of refining chamber 22 is an air outlet 122 that is connected back to coalescer feed line 70 via an air return line 124. At one end of chamber 22 is an oil outlet 126 that is connected to an oil waste line 128. Refining chamber 22 includes a level sensor 128 that can be the same as or similar to that used in pre-filter tank 14, except that only two levels A and B need be detected by the sensor.

As mentioned above, oil that has accumulated in either pre-filter tank 14, oil accumulator 18, or refining chamber 22 is periodically or continuously transferred to waste oil holding tank 26 using pump 28. This is accomplished using one-way valves 132, 134, and 136 that each feed into a common oil waste line 138 that is connected to pump 28. These valves allow oil to be drawn from tank 14, accumulator 18, and chamber 22 independently of each other.

Waste oil holding tank 26 includes a level sensor 140 that can be a dual bulb sensor as used for the other level sensors of separation system 10. Holding tank 26 has a waste oil inlet 142 that is connected via a one-way valve 144 to discharge line 146 at the pressure side of pump 28. Holding tank 26 also has a waste oil outlet line 148 that extends from the bottom of tank 26 through a one-way valve 150 to the vacuum side of pump 28. Holding tank 26 can be an industrial drum or other closed vessel in which case it includes a vent 152 to permit airflow into and out of the tank when oil is added or removed. In series with discharge line 146 is a bypass valve 154 and one-way valve 156. Bypass valve 154 is connected via a return line 158 back to intake line 30 so that liquid held in tank 26 or drawn from pre-filter tank 14, oil accumulator 18, or refining chamber 22 can be returned to pre-filter tank 14 for further processing. One-way valves 160 and 162 at each end of return line 158 are used along with bypass valve 154 to control the flow of liquid back to intake 30 when desired.

As mentioned above, the outlet 102 of coalescer 20 is coupled to pump 24 via a oneway valve 104. This is accomplished using a clean water discharge line 164. A bypass valve 166 is located in series with water discharge line 164 and is connected to a return line 168 so that water can be returned to bilge water holding tank 12 for further processing. A final one-way valve 170 can be located in discharge line 164 past valve 166 to control the discharge of water. To monitor operation of the system, monitors 172 such as vacuum gauges, pressure gauges, or flow meters can be placed at various points in the system. For addition of clean water (such as fresh seawater), a one-way valve 174 can be connected between a source of clean water and intake line 30. Also, separation system 10 can include an emergency bilge pump 176 and one-way valve 178 to discharge the contents of holding tank 12 if necessary.

As shown, separator 16, oil accumulator 18, and coalescer 20 are inclined so that the oil will move upwards into accumulator 18 and refining chamber 20, replacing water held therein. Chamber 22 is shown in a generally horizontal orientation, but can be inclined as well with air outlet 120 being located at the uppermost part of the vessel. Preferably, separator 16, oil accumulator 18, and coalescer 20 are inclined at an angle relative to horizontal within the range of 22–45° and, even more preferably, is set at an angle of approximately 22°.

Turning now to FIG. 5, air scrubber 106 is shown further detail. Air scrubber 106 is made up from a series of wafer-thin annular disks 180 of polypropylene. The disks are held stacked together with three retaining rods 182 (only two shown) that clamp the disks between two solid end caps 184, 186. Together the disks 180 and end caps 184, 186 define an inner chamber 188 into which air and water flow from coalescer feed line 70. The end caps are approximately ¼" in diameter larger than the polypropylene disks 180 and the top end cap 184 has a ¾" threaded hole through which feed line 70 passes. The disks 180 are approximately ⅛" thick with air scrubber 106 utilizing approximately 100 disks for a total length of twelve inches. The disks have oppositely oriented ridges on each side which, when stacked and held together with the retaining rods 44, make up the specific pore sizes for air scrubber 106. Different pore sizes may be required for different oils.

Referring momentarily to FIGS. 6–8, the construction and arrangement of the polypropylene disks 180 will now be described. The disks can each have an outer diameter of two inches. One side of each disk 180 has radially-extending ribs 190, as shown in FIG. 6. The other side of each disk has a series of concentric ribs 192, as shown in FIG. 7. Thus, as depicted in FIG. 8, when two disks 180 are stacked together the concentric ribs 192 overlie the radial ribs 190, thereby creating a sinuous path between inner chamber 188 and the exterior of air scrubber 106. Water entering inner chamber 188 flows outwardly across the surface of the disks, traveling along the sinuous path between the ribs 190 and 192. The polypropylene attracts the oil which coalesces to form larger droplets that then float upwardly, exiting coalescer 20 through air/oil outlet 100. The disks can be the same as that used in the Ein-Tal 30 mesh water filter, part number 06-21-30.1 available from Homeland Irrigation of Vero Beach, Fla. As will be appreciated, materials other than polypropylene can be used, such as polyethylene or even stainless steel depending upon the application. As an alternative design to that depicted in the illustrated embodiment, each disk can be designed to include a circular set of intermittent serpentine ribs and a series of concentric circular intermittent ribs on each side. The ribs can be 1/32" in height and width. The serpentine ribs on the top side of the disk would be located at a slightly different radial distance than the serpentine ribs on the bottom of the disk so that, when the disks are stacked together, the top side serpentine ribs of one disk interlock with the bottom side serpentine ribs of the next disk to maintain a 1/32" space between the adjacent ends of the raised ribs when the disks are assembled. Furthermore, the height of the ribs and the amount of spacing between the ends of adjoining ribs can be adjusted depending upon the type and amount of oil to be separated out.

Referring back to FIG. 5, air from refining chamber 22 is injected via air return line 124 into the water entering coalescer 20 through feed line 70. This is accomplished using an air injection manifold 194 connected in-line with feed line 70. Injection manifold 194 includes a restriction 196 and a venturi inlet port 198 that is located in restriction 196 and that is connected to the top of refining chamber 22 via air return line 124. As will be understood by those skilled in the art, water flowing through injection manifold 194 will accelerate to a higher velocity as it moves through restriction 196, creating a venturi effect at inlet port 198. This vacuum pulls air from refining chamber 22 which is drawn into the water flowing through manifold 194. This air then enters air scrubber 106 where oil attaches to it while it bubbles out and carries the oil up into refining chamber 22.

OPERATION OF THE SEPARATION SYSTEM

With reference back to FIG. 1, the setup and operation of separation system 10 will now be described. In general, separation system 10 operates in sequential stages, removing finer and finer droplets of the oil at each stage. Unlike conventional systems that use fine filtration elements to separate the smaller droplets of oil, separation system 10 operates to convert these droplets into larger droplets that are easily separated from the water. The remaining water is treated by a cross flow air scrubbing to remove residual oil and other hydrocarbons.

Initially, the system must be primed to charge the system with water and to establish the proper levels for efficient operation of the system. Fresh seawater may be used for this purpose. The first step in the priming operation is to open clean water valve 174, pre-filter waste line valve 132, and the waste oil holding tank inlet valve 144. All other valves are closed at this point. Then, pump 28 is started to draw fresh water through intake line 30 and into pre-filter tank 14. If needed, optional pump 36 can be used to pull clean water through intake line 30 and into tank 14. The clean water is added to tank 14, until level A on sensor 44 is reached. Then, valve 132 is closed while separator inlet valve 64 and oil accumulator outlet valve 134 are opened. The clean water is drawn into separator 16 and oil accumulator 18 until the high level A on sensor 90 is reached. Then, valve 134 is closed and refining chamber oil outlet valve 136 is opened. This results in coalescer 20 being filled with clean water followed by refining chamber 22 being filled. Once the high level A of sensor 130 is reached, valves 136 and 144 are closed and pump 28 is turned off. The system is now primed.

Normal operation begins by starting pump 24 and opening bilge water inlet valve 34 and cleaned water discharge valve 170. Pump 24 draws water from coalescer 20 and, within one minute establishes a system vacuum of about two to three inches of Mercury (Hg) through coalescer 20, separator 16, and pre-filter tank 14. By operating under vacuum, the line velocity of the fluid is slower than in most pressurized systems, thereby reducing the mechanical emulsification of oils. The reduced turbulence provided by this vacuum draw helps permit separation of the oil from the water. Since waste line valves 134 and 136 are closed, no water is drawn out of oil accumulator 18 or refining chamber 22 even though they experience the system vacuum pressure. After passing through strainer 32, the contaminated bilge water enters pre-filter tank 14 where the initial separation of oil and water occurs. Approximately 95% of the oil accumulates within tank 14. In addition to this initial separation, tank 14 operates to balance the flow from bilge water holding tank 12.

The water then moves to separator 16 after first passing through grit filter 48 which removes any dirt or other solid particles. Separator 16 provides a laminar flow to help settle out oil and utilizes the polypropylene perforated plates 74 to accumulate small droplets of oil and control the flow of water through the separator. Initially, the water enters chamber a of separator 16 in a turbulent manner. As the water moves across the first plate from chamber a to chamber b, the turbulence is reduced and the oil starts to rise to the top of the chambers. As the water moves through the chambers, more oil rises to the upper portion of each chamber. It has been found that the majority of the oil separates in the first five chambers and that only a small portion of the remaining oil separates in the last four chambers. The oil flows upward from chamber to chamber at the very top portion of each chamber until it reaches upper end 60. At this point the oil moves up into oil accumulator 18, displacing the water held therein which flows down into separator 16.

The water is then drawn into coalescer 20 via air scrubber 106. At this point, the water is substantially clean except for the finer droplets of oil and oil having a relatively neutral buoyancy. Coalescer 20 allows the finer oil droplets to combine into larger droplets that move up into air refining chamber 22 where they displace water that moves down into coalescer 20. Also, the air bubbles leaving air scrubber 106 accumulate light oils and fine oil droplets on their surface. These are carried upwards with the air bubbles into chamber 22. The perforated polypropylene plates 110 within coalescer 20 provide a final opportunity to accumulate oil by forming larger droplets that then float up into chamber 22. At this point, the water is essentially oil free and it leaves coalescer 20 via well point 114 which works to prevent the occurrence of a vortex as the fluid exits through outlet 102. The cleaned water can then be discharged into the ocean.

Bilge water inlet valve is kept open as long as the level within pre-filter tank 14 stays below A on level sensor 44. As the system continues, more and more of the water within tank 14 is replaced by oil. Once the oil level reaches down to level B on sensor 44, pump 28 is started and waste line valves 132 and 144 are opened to transfer the oil into holding tank 26. Similarly, once enough oil has replaced the water in oil accumulator 18 and refining chamber 22 such that the oil reaches B on their respective level sensors, pump 28 is started while tank inlet valve 144 and either waste line valve 134 or 136, or both, are opened to transfer the oil to holding tank 26. Once the oil level in holding tank 26 reaches level A on its sensor, pump 28 is started while holding tank outlet valve 150 and waste discharge valve 156 are opened. The reclaimed oil discharged through valve 156 can be pumped into drums for transporting to a suitable processing facility.

Depending upon the application and level of decontamination needed, additional separators and/or coalescers can be added, either in series for improved decontamination or in parallel for higher system flow rates. Also, optional processing of the clean water exiting separation system 10 can be carried out. This can include micro filtration and particle filtration down to, for example, 5 microns, organic filtering to remove dissolved hydrocarbons, ionic filtration for absorption of dissolved metals, and ultra filtration by reverse osmosis. Other such polishing steps will be apparent to those skilled in the art.

It will thus be apparent that there has been provided in accordance with the present invention a separation system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, instead of initially pumping bilge water into holding tank 12, the inlet end of intake line 30 can be submersed directly into the body of contaminated water in the ship's bilge. Also, standard flow valves can be utilized in place of the various one-way valves, in which case a check valve would also be placed in-line to prevent backflow. All such variations and modifications are intended to come within the scope of the appended claims.

I claim:

1. An oil/water separation system for treating contaminated water, comprising:

a separator having a housing that includes an inlet, a water outlet, and an oil outlet, said separator having a plurality of flow restrictors spaced within said housing between said inlet and said outlets, said flow restrictors and said housing together defining a plurality of sequential chambers located between said inlet and said outlets, said separator being disposed at an inclined angle with said inlet being located at a lower end of said housing and said outlets being located at an upper end of said housing such that said inlet opens into a first chamber within said housing and said outlets open into a last chamber within said housing, said oil outlet being located above said water outlet at said upper end of said housing;

an oil accumulator having an oil inlet and an oil outlet with said oil inlet being coupled to said oil outlet of said separator;

a coalescer having a housing that includes an inlet, a water outlet, and an oil/air outlet, said coalescer being disposed at an inclined angle with said inlet and said oil/air outlet being located at an upper end of said coalescer housing and said water outlet being located at a lower end of said coalescer housing, said inlet of said coalescer being coupled to said water outlet of said separator and being located below said oil/air outlet at said upper end of said coalescer housing, said coalescer including an air scrubber and coalescing element located in said coalescer housing between said upper and lower ends of said coalescer housing; and a pump for circulating the contaminated water through said separator and said coalescer.

2. An oil/water separation system as defined in claim 1, wherein said pump is coupled to said water outlet of said coalescer, whereby the contaminated water is circulated through said separator and said coalescer by a vacuum draw created by said pump.

3. An oil/water separation system as defined in claim 1, further comprising a waste oil holding tank and a second pump coupled to said oil outlet to pump separated oil from said oil accumulator into said holding tank.

4. An oil/water separation system as defined in claim 1, further comprising a pre-filter tank having an inlet for receiving the contaminated water and an outlet coupled to said inlet of said separator, wherein said pre-filter tank includes a filter for removing solids from the contaminated water.

5. An oil/water separation system as defined in claim 1, wherein said oil accumulator is disposed at an inclined angle with said oil inlet being located at a lower end of said oil accumulator and said oil outlet of said oil accumulator being located at an upper end of said oil accumulator.

6. An oil/water separation system as defined in claim 1, further comprising a second accumulator having an inlet, an air outlet, and an oil outlet, wherein said inlet of said second accumulator is coupled to said air/oil outlet of said coalescer and wherein said air outlet is located at an upper portion of said second accumulator and is coupled to said coalescer to provide air to said air scrubber.

7. An oil/water separation system as defined in claim 6, further comprising a coalescer feed line and air injection manifold connected in series between said separator water outlet and said coalescer inlet, wherein said air injection manifold includes a venturi inlet port that is coupled to said air outlet of said second accumulator, whereby air from said second accumulator is mixed into the contaminated water flowing into said coalescer, and wherein said coalescer inlet is connected to said air scrubber to thereby provide the mixed air and contaminated water into said air scrubber.

8. An oil/water separation system as defined in claim 1, wherein said flow restrictors comprise perforated plates.

9. An oil/water separation system as defined in claim 1, wherein said air scrubber comprises a stack of annular plates which together define an inner chamber and which have a surface conformation that provides a sinuous flow path from said inner chamber to the exterior of said air scrubber.

10. An oil/water separation system as defined in claim 1, wherein said coalescer includes a plurality of spaced flow restrictors located between said inlet and water outlet of said coalescer.

11. A separator assembly for use in separating immiscible liquids, comprising:

a housing that includes an inlet, a first outlet, and a second outlet;

a plurality of flow restrictors spaced within said housing between said inlet and said outlets, said flow restrictors and said housing together defining a plurality of sequential chambers located between said inlet and said outlets; and an accumulator having an inlet and an outlet with said accumulator inlet being coupled to said first outlet of said separator;

wherein said housing is disposed at an inclined angle with said inlet being located at a lower end of said housing and said outlets being located at an upper end of said housing such that said inlet opens into a first chamber within said housing and said outlets open into a last chamber within said housing, and wherein said first outlet is located above said second outlet at said upper end of said housing.

12. A separator assembly as defined in claim 11, wherein said inclined angle is within the range of twenty-two and forty-five degrees relative to horizontal.

13. A separator assembly as defined in claim 11, wherein said inclined angle is approximately twenty-two degrees relative to horizontal.

14. A separator assembly for use in separating immiscible liquids, comprising:

a housing that includes an inlet, a first outlet, and a second outlet;

a plurality of flow restrictors spaced within said housing between said inlet and said outlets, said flow restrictors and said housing together defining a plurality of sequential chambers located between said inlet and said outlets; and an accumulator having an inlet and an outlet with said accumulator inlet being coupled to said first outlet of said separator, wherein said accumulator is disposed at an inclined angle with said accumulator inlet being located at a lower end of said accumulator and said accumulator outlet being located at an upper end of said accumulator;

wherein said housing is disposed at an inclined angle with said housing inlet being located at a lower end of said housing and said first and second outlets being located at an upper end of said housing such that said housing inlet opens into a first chamber within said housing and said first and second outlets open into a last chamber within said housing, and wherein said first outlet is located above said second outlet at said upper end of said housing.

15. A coalescer assembly for use in separating immiscible liquids, comprising:

a housing that includes an inlet, a first outlet, and a second outlet, wherein said housing is disposed at an inclined angle with said inlet and said second outlet being located at an upper end of said housing and said first outlet being located at a lower end of said housing, and wherein said inlet is located below said second outlet at said upper end of said housing; and an air scrubber and coalescing element located in said housing between said upper and lower ends of said housing.

16. A coalescer assembly as defined in claim 15, wherein said air scrubber comprises a stack of annular plates which together define an inner chamber and which have a surface conformation that provides a sinuous flow path from said inner chamber to the exterior of said air scrubber.

17. A coalescer assembly as defined in claim 15, further comprising an accumulator having an inlet, an air outlet, and a liquid outlet, wherein said inlet of said accumulator is coupled to said second outlet of said housing and wherein said air outlet is located at an upper portion of said accumulator and is coupled to said housing to provide air to said air scrubber.

18. A coalescer assembly as defined in claim 17, further comprising a coalescer feed line and air injection manifold connected in series to said inlet of said housing, wherein said air injection manifold includes a venturi inlet port that is coupled to said air outlet of said accumulator and wherein said inlet of said housing is connected to said air scrubber.

19. A coalescer assembly as defined in claim 15, wherein said inclined angle is within the range of twenty-two and forty-five degrees relative to horizontal.

20. A coalescer assembly as defined in claim 15, wherein said inclined angle is approximately twenty-two degrees relative to horizontal.

* * * * *